United States Patent [19]
Kido et al.

[11] Patent Number: 5,295,710
[45] Date of Patent: Mar. 22, 1994

[54] ENERGY ABSORBING STEERING WHEEL ASSSEMBLY

[75] Inventors: Takayoshi Kido, Ino Hiratsuka; Tetsuya Watanabe, Fuji, both of Japan

[73] Assignees: Nissann Motor Co., Ltd.; Nihon Plast, Co., Ltd., both of Japan

[21] Appl. No.: 35,535

[22] Filed: Mar. 22, 1993

Related U.S. Application Data

[63] Continuation of Ser. No. 792,190, Nov. 14, 1991, abandoned.

[30] Foreign Application Priority Data

Nov. 16, 1990 [JP] Japan .................................. 2-310846

[51] Int. Cl.$^5$ ............................................... B62D 1/11
[52] U.S. Cl. ..................................... 280/750; 280/777
[58] Field of Search ................. 280/777, 750, 748, 751

[56] References Cited

U.S. PATENT DOCUMENTS 4,660,852  4/1987  Katayama et al. .................. 280/750
4,953,423  9/1990  Maeda et al. ....................... 280/777

FOREIGN PATENT DOCUMENTS 61-103276  7/1986  Japan .

Primary Examiner—Margaret A. Focarino
Assistant Examiner—Paul N. Dickson
Attorney, Agent, or Firm—Lowe, Price, LeBlanc & Becker

[57] ABSTRACT

An energy absorbing steering wheel assembly for use with a steering shaft includes an annular rim, a hub connecting the annular rim drivingly with an end portion of the steering shaft, a center covering member positioned at a generally center portion of the annular rim, and an energy absorbing structure positioned between the hub and the center covering member. The energy absorbing structure comprising a first portion connected to the center covering member, a second portion connected to the hub, a third portion which is sandwiched between the first and second portions, and brace members for minimizing displacement of the first portion and the third portion relative to each other and to the second portion when an impact load, exceeding a predetermined magnitude, is applied to the center covering member at an angle to the steering shaft.

6 Claims, 4 Drawing Sheets

ENERGY ABSORBING STEERING WHEEL ASSSEMBLY

This application is a continuation of application Ser. No. 07/792,190 filed Nov. 14, 1991 abandoned.

BACKGROUND OF THE INVENTION

1. Field of the Invention

The present invention relates in general to a steering wheel assembly for vehicles, and more particularly to an energy absorbing steering wheel assembly which is capable of minimizing damages to a driver in case of an accident and possible impact between the steering wheel and the driver's body.

2. Description of the Prior Art

Japanese Utility Model First Provisional Publication 61-103276 discloses an energy absorbing steering wheel assembly. This steering assembly comprises a cylindrical energy absorbing member which is installed between an upper mounting plate secured to a covering pad and a lower mounting plate connected to a hub receiving therein an end portion of a steering shaft. The covering pad is positioned at a general center of an annular rim and connected to the rim through a plurality of spokes extending radially outwardly therefrom. The covering pad conceals the cylindrical member so as to improve an external appearance of the steering wheel. The cylindrical member is received at its top portion in a rectangular opening of the upper mounting plate and at its bottom portion in a rectangular opening of the lower mounting plate. The cylindrical member is secured to the upper and lower mounting plates by welding or the like.

When, due to a vehicle collision or the like, the body of a driver collides against the covering pad of the steering wheel, impact energy is dissipated by deformation of the cylindrical member. In case that impact energy is applied to the covering pad along the axis of the steering shaft, the cylindrical member is compressively deformed in a controlled manner so as to dissipate impact energy satisfactorily.

However, in case that impact energy is applied to the covering pad at an angle to the axis of the steering shaft, the upper mounting plate and the cylindrical member tend to be displaced relative to each other and to the lower mounting plate. With this, a desired load-deformation characteristic may not be obtained so that impact energy may not be dissipated satisfactorily.

SUMMARY OF THE INVENTION

It is therefore an object of the present invention to provide an energy absorbing steering wheel assembly which can assuredly absorb impact energy even when impact energy is applied to a covering pad of a steering wheel at an angle to the axis of a steering shaft.

According to a first aspect of the present invention, there is provided a steering wheel assembly for use with a steering shaft, the assembly including: an annular rim; a hub connecting the annular rim drivingly with the steering shaft; a center covering member positioned at a generally center portion of the annular rim; and an energy absorbing structure positioned between the hub and the center covering member, the energy absorbing structure being made so as to be compressively deformed to dissipate an impact load, exceeding a predetermined magnitude, which is applied to the center covering member, the energy absorbing structure being arranged so as to be compressively deformed substantially toward the steering shaft when the impact load is applied to the center covering member at an angle to the steering shaft.

According to a second aspect of the present invention, there is provided a steering wheel assembly for use with a steering shaft, the assembly including: an annular rim; a hub connecting the annular rim drivingly with the steering shaft; a center covering member positioned at a generally center portion of the annular rim; and an energy absorbing structure positioned between the hub and the center covering member, the energy absorbing structure being made so as to be compressively deformed to dissipate an impact load, exceeding a predetermined magnitude, which is applied to the center covering member, the energy absorbing structure including a first portion connected to the center covering member, a second portion connected to the hub, a third portion which is sandwiched between the first and second portions, and means for minimizing displacement of the first portion and the third portion relative to each other and to the second portion when the impact load is applied to the center covering member at an angle to the steering shaft.

DESCRIPTION OF THE PREFERRED EMBODIMENT

Referring to FIGS. 1 to 5, there is shown an energy absorbing steering wheel assembly of the present invention.

Figure 1:
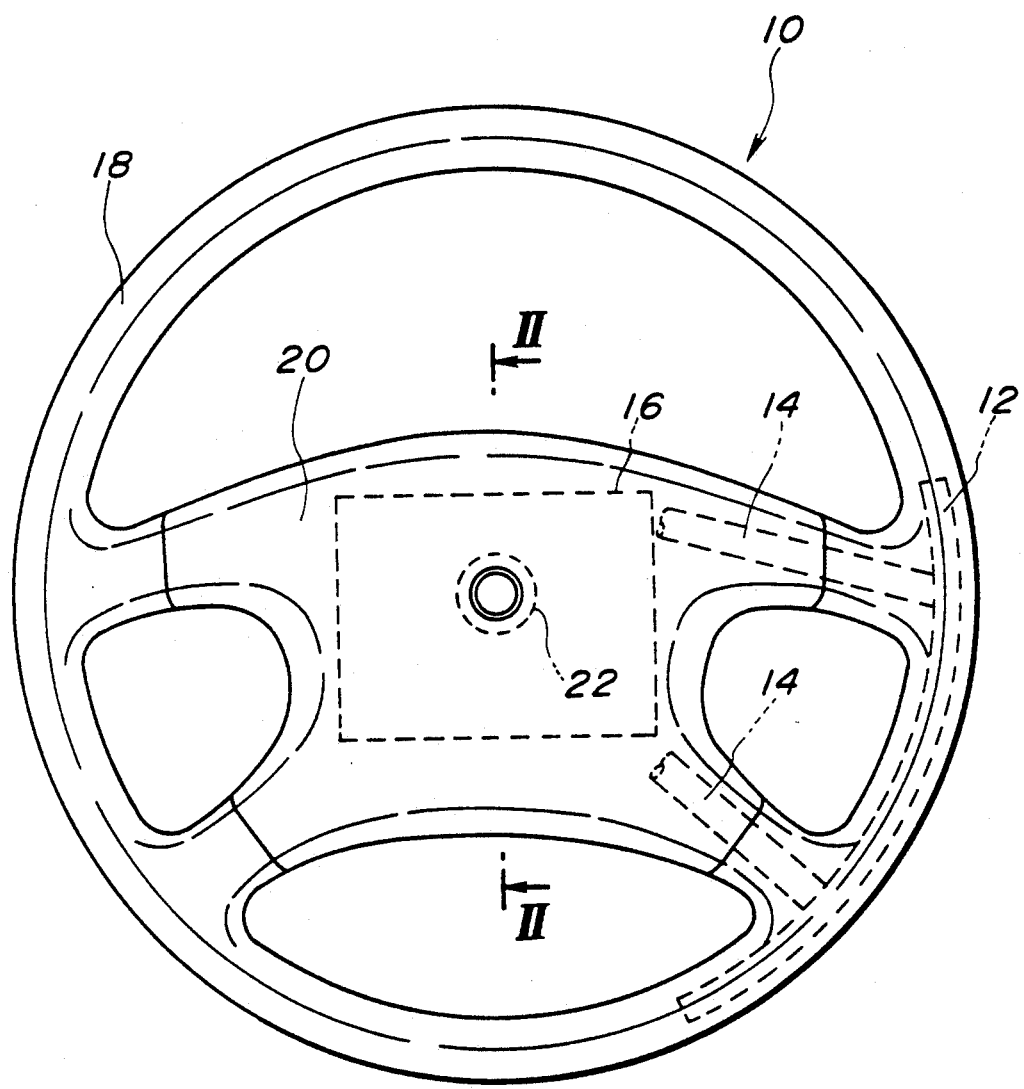
FIG. 1 is a plan view of an energy absorbing steering wheel assembly.

As is seen from FIG. 1, the steering wheel assembly 10 comprises an annular rim 12 and a plurality of spokes 14 extending radially inwardly from the rim 12. The steering wheel assembly 10 is equipped with an energy absorbing member 16 at a general center of the rim 12. The rim 12 and outer end portions of the spokes 14 are covered with a substantially annular covering member 18. The energy absorbing member 16 and inner major portions of the spokes are covered with a center covering member 20. As will be clarified hereinafter, the spokes 14 are drivingly connected to a steering shaft 22, so that rotational steering input to the rim 12 will effect the rotation of the steering shaft 22.

Figure 2:
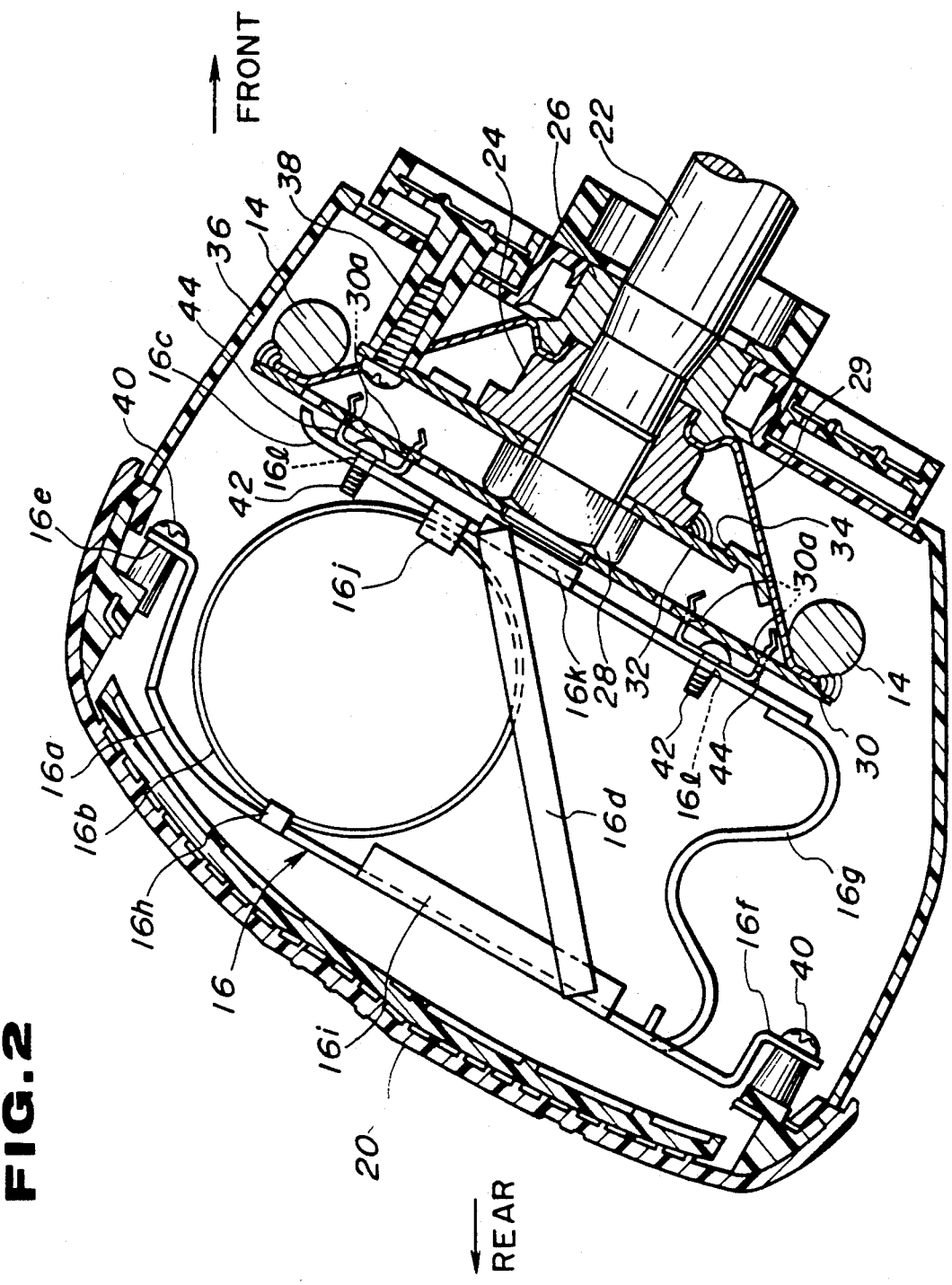
FIG. 2 is a sectional view which is taken along the line of II—II of FIG. 1.

As is seen from FIG. 2, an upper end of the steering shaft 22 extends through upper and lower hubs 24 and 26, and is threaded to receive a nut 28 fixing the upper and lower hubs 24 and 26 to the steering shaft 22.

A supporting plate 29 is interposed at its inner end portions between the upper and lower hubs 24 and 26, and extends outwardly from the steering shaft 22. The supporting plate 29 is bent at its outer end portions so as to place a mounting plate 30 thereon. Outer end portions of the mounting plate 30, the outer end portions of the supporting plate 29 and the spokes 14 are welded together. Thus, the spokes 14 are drivingly connected to the steering shaft 22. The mounting plate 30 is formed with a plurality of slits 30a for the reason which will be clarified hereinafter.

A mounting bracket 32 is welded to the upper hub 24 and interposed at its inner portion between the upper hub 24 and the nut 28. An outer end portion of the mounting bracket 32 is placed on a supporting bracket 34 which is secured to the supporting plate 29.

A casing 36 which covers the upper and lower hubs 24 and 26 is secured to the mounting bracket 32 through a plurality of screws 38 (only one is shown).

The aforementioned center covering member 20 is detachably fixed to the casing 36. The energy absorbing member 16 is installed between the center covering member 20 and the mounting plate 30 so as to be concealed by the center covering member 20.

Figure 3:
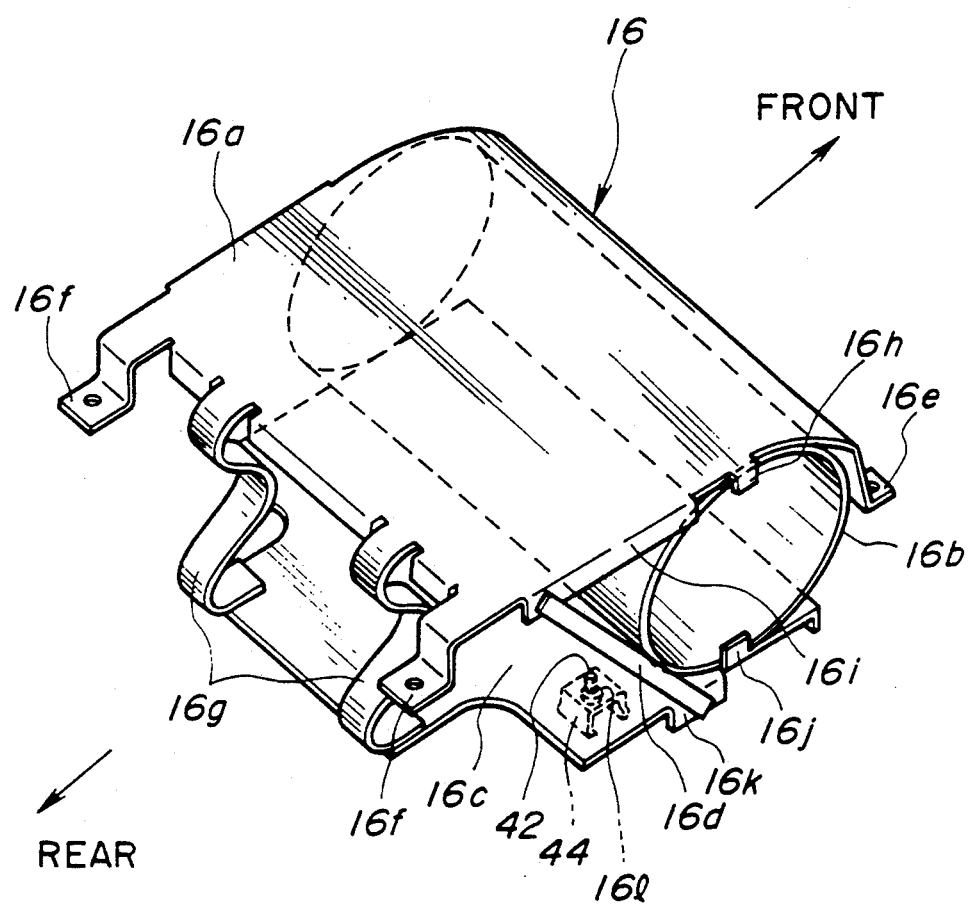
FIG. 3 is a perspective view of an energy absorbing member of the steering wheel assembly.

As is seen from FIG. 3, the energy absorbing member 16 comprises an upper plate 16a, a cylindrical member 16b, a lower plate 16c and two brace members 16d (only one is shown).

The upper plate 16a is monolithically formed at its front corner portions with two front lugs 16e (only one is shown), at its rear corner portions with two rear lugs 16f, at its rear end portion between the rear lugs 16f with two spaced sigmoid portions 16g, and at its side end portions with front and rear downwardly-bent portions 16h and 16i.

The lower plate 16c is monolithically formed at side end portions with upwardly bent portions 16j (only one is shown), at side end portions beside the upwardly bent portions 16j with downwardly bent portions 16k (only one is shown), and with circular through holes 16l (only one is shown in FIG. 3).

The cylindrical member 16b is transversely positioned with respect to a vehicle and sandwiched between the upper and lower plates 16a and 16c. The cylindrical member 16b is interposed at its top portion between the front bent portions 16h of the upper plate 16a, and at its bottom portion between the upwardly bent portions 16j of the lower plate 16c. The cylindrical member 16b is welded to the front bent portions 16h of the upper plate 16a and the upwardly bent portions 16j of the lower plate 16c. The upper plate 16a is curved at its front portion so as to cover a front upper portion of the cylindrical member 16b.

Each brace member 16d is welded at longitudinally opposed end portions thereof to the rear bent portion 16i of the upper plate 16a and the downwardly bent portion 16k of the lower plate 16c, respectively. However, if desired, the brace member may be pivotally connected at the end portions thereof to the rear bent portion 16i and the downwardly bent portion 16k. Thus, the brace members 16d are diagonally positioned with respect to the upper and lower plates 16a and 16c so as to direct a major side of the brace member 16d toward an upper front side in FIG. 3.

The sigmoid portions 16g of the upper plate 16a are respectively welded at lower end portions thereof to rear corner portions of the lower plate 16c.

As is seen from FIG. 2, the energy absorbing member 16 is secured at its front and rear lugs 16e and 16f of the upper plate 16a to the center covering member 20 through screws 40, and at its lower plate 16c to the mounting plate 30 through screws 42 and U-shaped flexible plates 44. The U-shaped plates 44 are secured to the lower plate 16c through the screws 42 received in the through holes 16l, and detachably received in the slits 30a of the mounting plate 30.

Figure 4:
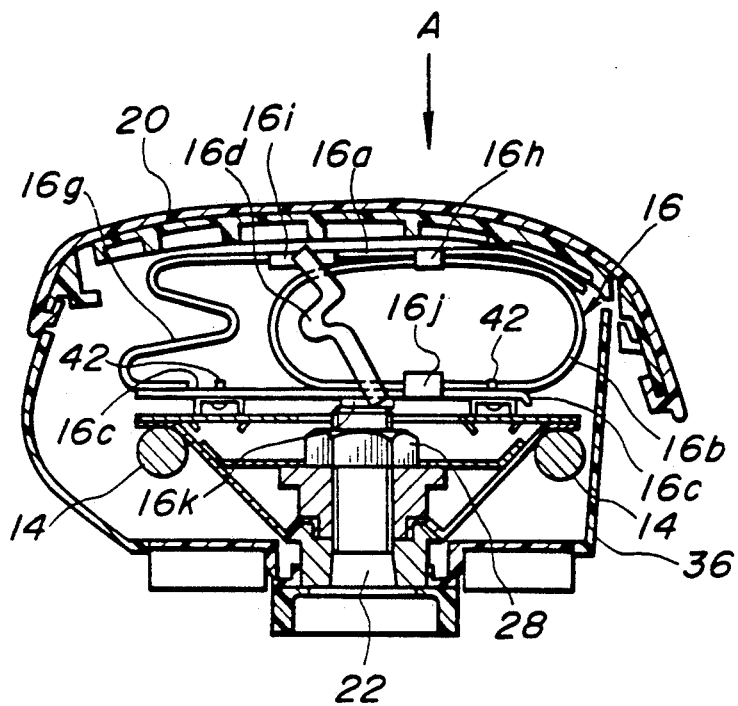
FIG. 4 is a view similar to FIG. 2, but showing a condition in which impact energy is applied to a center covering member of the steering wheel along the axis of a steering shaft.

As is seen from FIG. 4, in the event that the body of a driver collides against the center covering member 20 of the steering wheel 10, when its impact load shown as an arrow "A", exceeding a predetermined magnitude, is applied to the center covering member 20 along the axis of the steering shaft 22, the energy absorbing member 16 including the brace members 16d is compressively deformed so as to dissipate impact energy applied to the center covering member 20.

Figure 5:
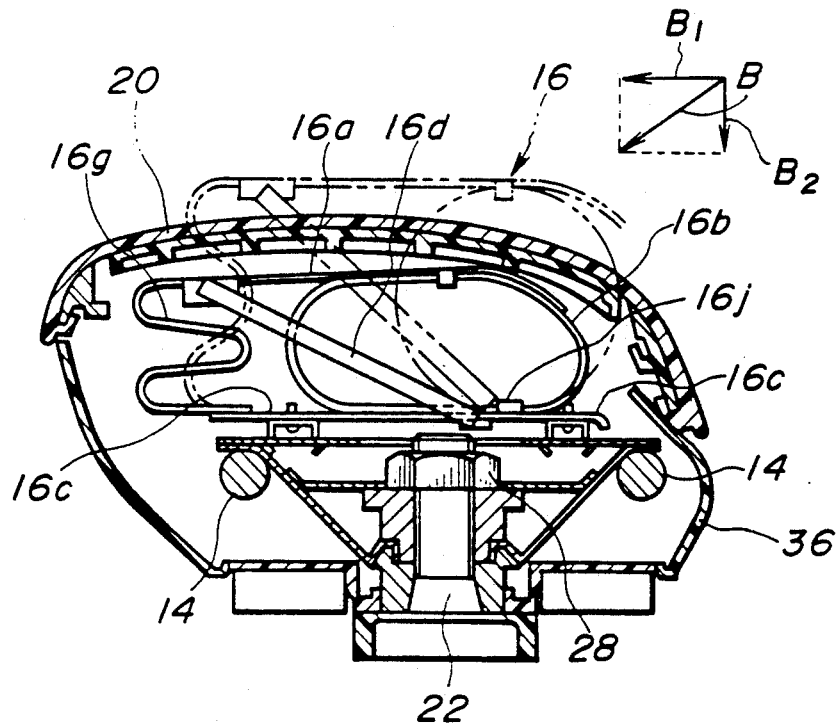
FIG. 5 is a view similar to FIG. 4, but showing a condition in which impact energy is applied to the center covering member at an angle to the steering shaft.

As is seen from FIG. 5, in the event that an impact load shown as an arrow "B", exceeding a predetermined magnitude, is applied to the center covering member 20 at an angle to the axis of the steering shaft 22, the upper plate 16a and the cylindrical member 16b of the energy absorbing member 16 tend to be displaced obliquely in a leftward direction in FIG. 5 relative to each other and to the lower plate 16c, as illustrated. If this type of oblique displacement of the upper plate 16a and the cylindrical memner 16b exceed a certain degree, impact energy can not be dissipated satisfactorily by the energy absorbing member 16. Therefore, in order to prevent or at least minimize this type of displacement of the upper plate 16a and the cylindrical member 16b, an end portion of the diagonal brace member 16d connecting the upper plate 16a with the lower plate 16c is positioned very close to the upwardly bent portion 16j of the lower plate 16c to which the cylindrical member 16b is welded. Furthermore, the major side of the brace member 16d is oriented to face the impact load "B". In this unique structure of the energy absorbing member 16, the brace members 16d take tension to prevent or at least minimize the above-mentioned type of displacement of the upper plate 16a and the cylindrical member 16b relative to each other and to the lower plate 16c.

The function of the brace members 16d will be clearly described in the following.

Referring to FIG. 5, the impact load "B" which has direction as well as a magnitude can be looked upon as a vector which can be resolved into two components, "$B_1$" and "$B_2$". The component "$B_1$" acts parallel to a major surface of the lower plate 16c and perpendicular to the axis of the steering shaft 22. The component "$B_2$" acts parallel to the axis of the steering shaft 22 and perpendicular to the major surface of the lower plate 16c. By the provision of the brace members 16d, displacement of the upper plate 16a and the cylindrical member 16b relative to each other and to the lower plate 16c due to the component "$B_1$" in a direction perpendicular to the axis of the steering wheel 22 can be minimized.

Thus, the energy absorbing member 16 is compressively deformed in a controlled manner so as to dissipate impact energy satisfactorily.

In the above-mentioned embodiment of the present invention, the upper and lower hubs 24 and 26 are drivingly connected to the rim 12 through the spokes 14. However, it should be noted that in the case wherein the steering wheel does not have spokes, the hub may be directly secured to the rim.

What is claimed is:

1. A steering wheel assembly for use with a steering shaft, said assembly comprising:
   an annular rim;
   a hub connecting said annular rim drivingly with said steering shaft;

a center covering member positioned at a generally center portion of said annular rim; and an energy absorbing structure positioned between said hub and said center covering member, said energy absorbing structure being made so as to be compressively deformed to dissipate an impact load, exceeding a predetermined magnitude, which is applied to said center covering member, said energy absorbing structure comprising a first portion connected to said center covering member, a second portion connected to said hub, a hollow cylindrical portion having opposed open end portions, said hollow cylindrical portion being sandwiched longitudinally between said first and second portions and being attached to transverse edges of said first and second portions, respectively, at said opposed open end portions, and an elongate member for minimizing displacement of said first portion and said hollow cylindrical portion relative to each other and to said second portion when said impact load is applied to said center covering member at an angle to an axis of said steering shaft, said elongate member having longitudinally opposed ends, one of said opposed ends attached to a transverse edge of said first portion with the other opposed end attached to a transverse edge of said second portion such that said elongate member is diagonally arranged relative to said first and second portions and in a plane containing said transverse edges, the opposed end of said elongate member attached to the transverse edge of said second portion being proximate to the attachment of said one of the opposed open end portions to the second portion and being between the attachment of one of said opposed open end portions of said hollow cylindrical portion to said second portion and a location on the transverse edge of said second portion substantially coincident with a plane that intersects an axis of said steering shaft and is normal to the transverse edge of said second portion.

2. A steering wheel assembly as claimed in claim 1, in which said elongate member is diagonally arranged with respect to said first and second portions so as to orient a major side of said elongate member to face said impact load.

3. A steering wheel assembly as claimed in claim 1, in which said first portion is monolithically formed with a sigmoid portion extending toward said second portion and secured thereto.

4. A steering wheel assembly as claimed in claim 1, in which said first portion is curved so as to cover a part of said hollow cylindrical portion.

5. A steering wheel assembly as claimed in claim 1, further comprising a mounting bracket connected to said hub, said second portion being detachably mounted on said mounting bracket.

6. A steering wheel assembly as claimed in claim 1, in which said elongate member minimizes displacement of said first portion and said hollow cylindrical portion relative to each other and to said second portion in a direction perpendicular to said axis of said steering shaft.

* * * * *